US008145467B1

(12) United States Patent
Ou et al.

(10) Patent No.: US 8,145,467 B1
(45) Date of Patent: Mar. 27, 2012

(54) METHOD AND APPARATUS FOR PROFILING A HARDWARE/SOFTWARE EMBEDDED SYSTEM

(75) Inventors: Jingzhao Ou, Sunnyvale, CA (US); Chi Bun Chan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 879 days.

(21) Appl. No.: 12/036,920

(22) Filed: Feb. 25, 2008

(51) Int. Cl.
G06F 17/50 (2006.01)

(52) U.S. Cl. .......................................................... 703/15

(58) Field of Classification Search .................... 716/16, 716/117; 703/16, 17, 13
See application file for complete search history.

(56) References Cited

U.S. PATENT DOCUMENTS

| | | | | |
|---|---|---|---|---|
| 4,811,283 A * | 3/1989 | Gembarowski | ................. | 714/15 |
| 5,218,703 A * | 6/1993 | Fleck et al. | .................... | 710/264 |
| 5,768,567 A * | 6/1998 | Klein et al. | ..................... | 703/13 |
| 6,330,626 B1 * | 12/2001 | Dennin et al. | ................. | 710/52 |
| 6,633,838 B1 * | 10/2003 | Arimilli et al. | ................ | 703/16 |
| 6,751,583 B1 * | 6/2004 | Clarke et al. | .................... | 703/17 |
| 7,089,175 B1 * | 8/2006 | Nemecek et al. | ............... | 703/28 |
| 7,711,535 B1 * | 5/2010 | Brookes et al. | ................ | 703/14 |
| 7,747,766 B2 * | 6/2010 | Chung et al. | .................. | 709/230 |
| 2004/0215438 A1 * | 10/2004 | Lumpkin et al. | ................ | 703/22 |
| 2005/0071602 A1 * | 3/2005 | Niell et al. | ..................... | 712/202 |

OTHER PUBLICATIONS

Shannon, Lesley et al., "Using Reconfigurability to Achieve Real-Time Profiling for Hardware/Software Codesign," *Proceedings of the 2004 ACM/SIGDA 12th International Symposium on Field Programmable Gate Arrays (FPGA '04)*, Feb. 22-24, 2004, Monterey, California, pp. 190-199.
Fenlason, Jay et al.., "The Gnu Profiler," copyright 1988, pp. 1-26, downloaded on Feb. 27, 2008 from http://www.gnu.org/software/binutils/manual/gprof-2.9.1/html_mono/gprof.html.

* cited by examiner

*Primary Examiner* — Paul Rodriguez
*Assistant Examiner* — Bernard E Cothran
(74) *Attorney, Agent, or Firm* — Robert M. Brush; LeRoy D. Maunu

(57) ABSTRACT

Method and apparatus for profiling a hardware/software embedded system are described. In one example, a hardware co-simulation interface is generated between a programmable logic device (PLD) configured with the embedded system and a computer based on a plurality of events. The embedded system in the PLD is simulated. During the simulation of the embedded system, occurrence of at least one event is detected to produce profiling data. The profiling data is stored into shared first-in-first-out (FIFO) logic of the PLD and the computer. The profiling data is retrieved from the shared FIFO logic at the computer.

14 Claims, 8 Drawing Sheets

METHOD AND APPARATUS FOR PROFILING A HARDWARE/SOFTWARE EMBEDDED SYSTEM

FIELD OF THE INVENTION

One or more aspects of the present invention relate generally to electronic design automation and simulation and, more particularly, to a method and apparatus for profiling a hardware/software embedded system.

BACKGROUND OF THE INVENTION

Embedded systems combine a processor executing software with dedicated logic. The embedded systems may be implemented within an integrated circuit, such as a programmable logic device. Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

PLDs allow a designer to implement an embedded system with both processors as "software" components, and dedicated hardware peripherals as "hardware" components. These hardware and software components communicate with each other through some specific bus interfaces. In the design phase, a target application is partitioned into a number of portions. Some portions are executed on the software components as software programs, while the other portions are executed on the hardware components.

The behavior of the hardware and software components, as well as the bus interfaces between them, can be simulated using co-simulation techniques. In some instances, multiple software simulators can be used to simulate the hardware and software components of an embedded system. In yet other instances, the PLD devices themselves are used in the simulation as emulators. In this case, a portion of a design physically runs on a PLD device while the rest of the design is simulated by the software simulators running on a computer. A hardware co-simulation interface controls the simulation progress of the software simulators and the emulation hardware, and exchange simulation data between them when needed.

In particular, due to the various design trade-offs offered by implementing a functionality as either a software components or a hardware component, it is desirable to measure the performance of an embedded system running on a PLD. A performance metric may be based on the number of clock cycles the processor spent executing specified portions of the software code, or based on the number of clock cycles a dedicated hardware peripheral used to finish processing one input data sample. Techniques for measuring these performance metrics are referred to as profiling. If a specific hardware-software partitioning does not meet the necessary design requirements, a designer may choose to re-partition the system, or optimize the bottle-neck software and hardware components.

One kind of profiling technique is based on cycle-accurate software simulation. When using this technique, the status of the software and hardware components is recorded during the cycle-accurate software simulation. The recorded status information is then analyzed to obtain the profiling data of interest. These cycle-accurate simulation based techniques are inefficient due to the large amount of computation required by the cycle-accurate software simulation and thus have limited uses in practice. Some profiling techniques, such as the GNU gprof tool available from the Free Software Foundation, Inc., insert code into the software program running on the processor to generate specific interrupts. The profiling data is obtained in the service routines for these interrupts. There are a few limitations of such tools: (1) such tools provide intrusive profiling in that the inserted code and interrupts change the cycle-by-cycle behavior of the processor system (i.e., intrusive); (2) such tools support limited profiling precisions as responding to interrupts is usually an expensive operation; and (3) such tools only support profiling of events generated by the processor and do not support profiling events generated by peripherals coupled to the processor, and thus is not suitable for hardware-software co-design.

Some on-chip profiling techniques make use of on-chip PLD resources, such as significant portions of on-chip memory to store the profiling data. PLD resources are often scarce and are demanded by the dedicated logic of the embedded system. Competition for PLD resources may limit the amount of profiling data that can be retrieved by the user, and thus the effectiveness of such profiling techniques.

Accordingly, there exists a need in the art for a method and apparatus for profiling a hardware/software embedded system that overcomes the aforementioned deficiencies.

SUMMARY OF THE INVENTION

An aspect of the invention relates to profiling an embedded system. A hardware co-simulation interface is generated between a programmable logic device (PLD) configured with the embedded system and a computer based on a plurality of events. The embedded system in the PLD is simulated. During the simulation of the embedded system, occurrence of at least one event is detected to produce profiling data. The profiling data is stored into shared first-in-first-out (FIFO) logic of the PLD and the computer. The profiling data is retrieved from the shared FIFO logic at the computer.

An aspect of the invention relates to an apparatus for profiling an embedded system. A hardware co-simulation interface between a programmable logic device (PLD) configured with the embedded system and a computer is provided. Profiling logic is provided in the hardware co-simulation interface. The profiling logic is configured to detect occurrence of a plurality of events during simulation of the embedded system to produce profiling data. Shared first-in-first-out (FIFO) logic is configured to store the profiling data produced by the profiling logic.

An aspect of the invention relates to a co-simulation system having profiling logic. A programmable logic device (PLD) is configured with an embedded system. A computer is configured to drive a simulation of the embedded system in the PLD. A hardware co-simulation interface is provided between PLD and the computer. Profiling logic is included in the hardware co-simulation interface and is configured to detect occurrence of a plurality of events during simulation of the embedded system to produce profiling data. Shared first-in-first-out (FIFO) logic is configured to store the profiling data produced by the profiling logic.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 1 illustrates an FPGA architecture in accordance with one or more aspects of the invention.

DETAILED DESCRIPTION

Method and apparatus for profiling an embedded system that includes both software and hardware components is described. In some embodiments, a portion of the embedded system is emulated on a PLD, while the other portion is simulated using a computer. Based on a plurality of user-specific events, a customized hardware co-simulation interface is generated between a programmable logic device (PLD) configured with the embedded system and a computer. During the simulation of the embedded system, occurrence of at least one event is detected to produce profiling data. The profiling data is temporarily stored into a shared first-in-first-out (FIFO) logic of the PLD and is continuously transmitted back to the computer through the hardware co-simulation interface. A clock control unit monitors the status of the shared FIFO logic and ensures that the shared FIFO logic does not overflow, thus preventing the unexpected lost of profiling data. The computer has abundant memory to store the profiling data transmitted from the hardware co-simulation interface. Analysis of the profiling data can be performed on the computer.

In some embodiments, a PLD is configured with a portion of an embedded system. A computer is configured to drive an emulation of the embedded system running in the PLD. A hardware co-simulation interface is provided between the PLD and the computer. Profiling logic is included in the hardware co-simulation interface and is configured to detect occurrence of a plurality of events during simulation of the embedded system to produce profiling data. Shared FIFO logic is configured to store the profiling data produced by the profiling logic. The profiling logic contains a clock control unit. A clock control unit monitors the status of the shared FIFO logic. The clock control unit stops the emulation of the embedded system when the shared FIFO logic is full and cannot accept more profiling data. By doing so, the clock control unit prevents the unexpected lost of profiling data. More specifically, when the shared FIFO logic is full, the clock control unit automatically stops the execution of the embedded system. The hardware co-simulation interface continues transmitting profiling data stored in the shared FIFO logic to the computer till the shared FIFO logic has enough space available for storing new data. Then, the clock control unit resumes the execution of the embedded system so that new profiling data can be generated and stored at the shared FIFO logic.

Figure 1:
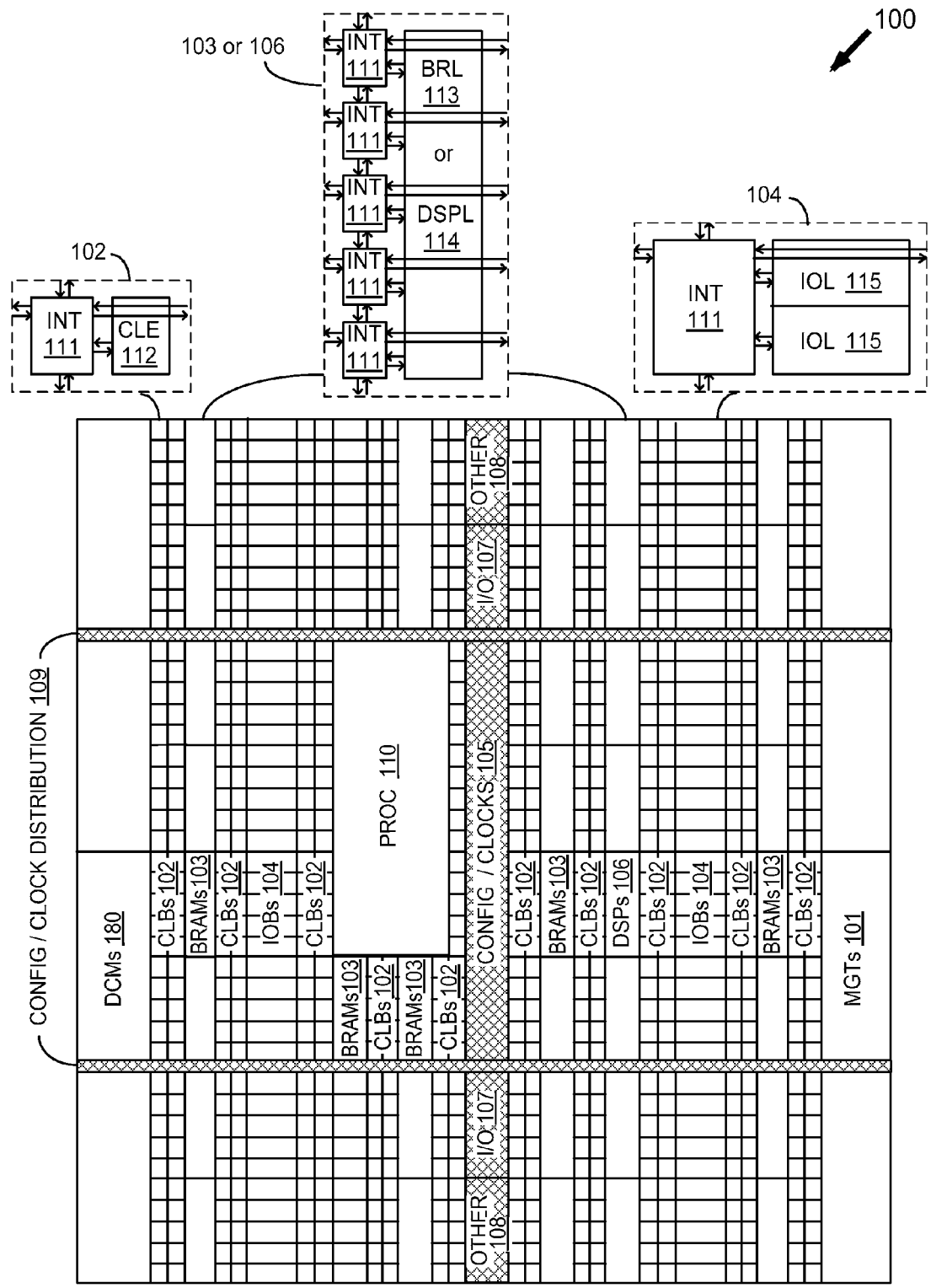

FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such, analog-to-digital converters, system monitoring logic, digital clock managers (DCMs), and so forth. A given set of programmable tiles of an FPGA is referred to herein as a programmable fabric of the FPGA.

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

The FPGA architecture 100 also includes one or more dedicated processor blocks (PROC 110). The processor block 110 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic (e.g., CLBs, IOBs). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art. The processor block 110 is coupled to the programmable logic of the FPGA in a well known manner.

In the pictured embodiment, a columnar area near the center of the die (shown crosshatched in FIG. 1) is used for configuration, clock, and other control logic. Horizontal areas 109 extending from this column are used to distribute the clocks and configuration signals across the breadth of the FPGA. Together, the logic 105 and the logic 109 comprise a clock distribution network in the FPGA. In other embodiments, the configuration logic may be located in different areas of the FPGA die, such as in the corners of the FPGA die. Configuration information for the programmable logic is stored in configuration memory. The configuration logic 105 provides an interface to, and loads configuration data to, the configuration memory. A stream of configuration data ("configuration bitstream") may be coupled to the configuration logic 105, which in turn loads the configuration memory.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations as well as the location of the blocks within the array included at the top of FIG. 1 are purely exemplary. For example, in an actual FPGA more than one adjacent column of CLBs is typically included wherever the CLBs appear, to facilitate the efficient implementation of user logic.

Figure 2:
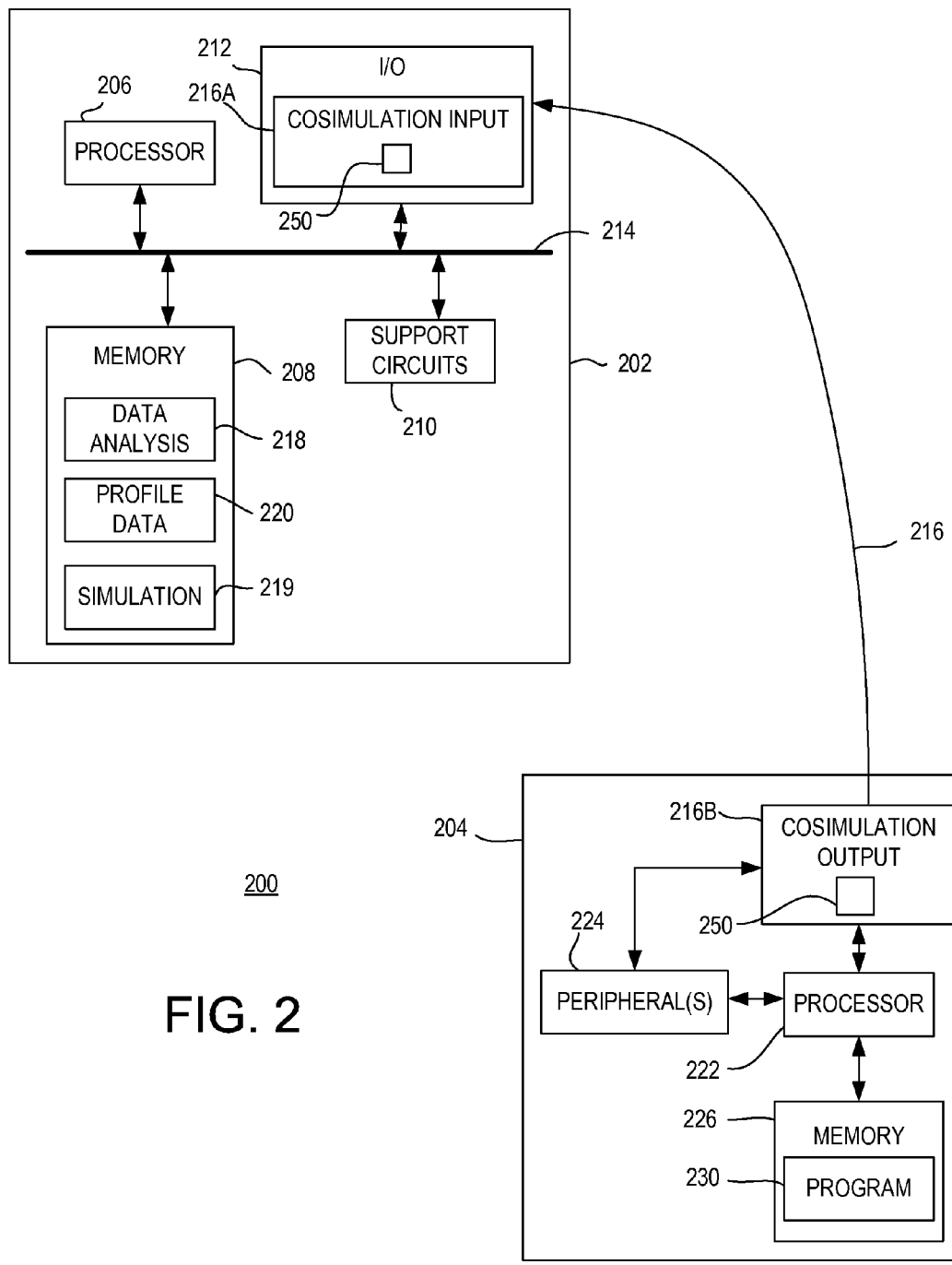
FIG. 2 is a block diagram depicting an exemplary embodiment of a co-simulation system in accordance with one or more aspects of the invention.

FIG. 2 is a block diagram depicting an exemplary embodiment of a co-simulation system 200 in accordance with one or more aspects of the invention. The co-simulation system 200 includes a computer 202 coupled to an FPGA 204. The FPGA 204 may include an architecture similar to that described above, for example. The computer 200 may include a processor 206, a memory 208, various support circuits 210, and an I/O interface 212, each coupled to a bus 214. The processor 206 may include one or more microprocessors known in the art. The support circuits 208 for the processor 206 include conventional cache, power supplies, clock circuits, data registers, I/O interfaces, and the like. The I/O interface 212 may include co-simulation input logic 216A. The memory 208 may include one or more of the following random access memory, read only memory, magneto-resistive read/write memory, optical read/write memory, cache memory, magnetic read/write memory, and the like, as well as signal-bearing media as described below. The memory 208 may store data analysis module 218, simulation module 219, and profile data 220.

The FPGA 204 includes a processor 222, one or more peripherals 224, a memory 226, and co-simulation output logic 216B. The peripherals 224 and the memory 226 are configured for communication with the processor 222. The processor 222 may be a hardware or software processor embedded in the FPGA 204, as described above with respect to FIG. 1. The peripherals 224 may comprise any type of hardware logic circuitry known in the art (e.g., dedicated logic circuitry or programmed configurable logic of the FPGA 204). The memory 226 may include random access memory or the like embedded in the FPGA 204 (e.g., BRAM) and/or in the processor 222 (e.g., cache memory). The memory 226 is configured to store program code 230 for execution by the processor 222.

Figure 3:
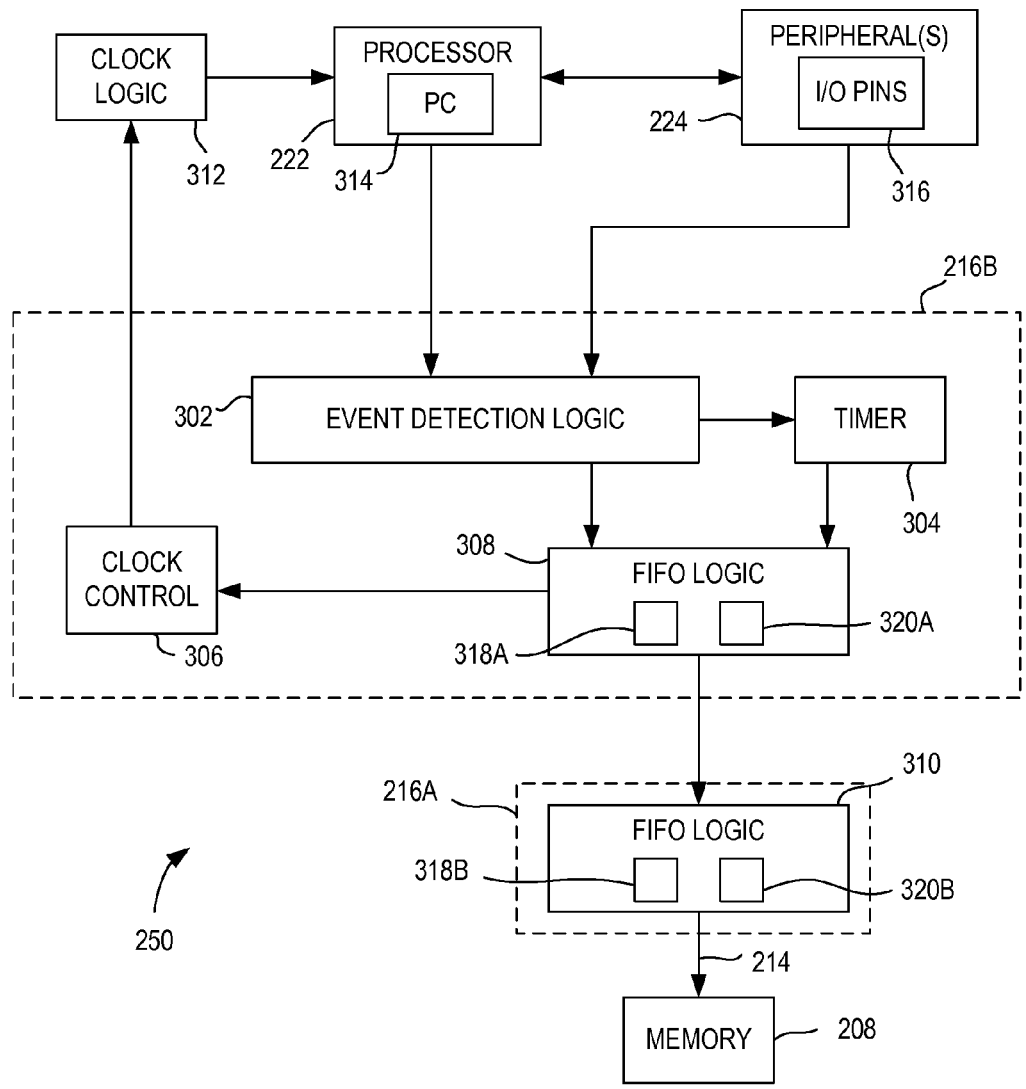
FIG. 3 is a block diagram depicting an exemplary embodiment of profiling logic in accordance with one or more aspects of the invention.

The co-simulation system 200 is configured to simulate an embedded system having a hardware portion and a software portion. In the present example, the hardware portion includes the peripherals 224. The software portion includes the program 230. The co-simulation input logic 216A and the co-simulation output logic 216B form at least a portion of a co-simulation interface 216 between the computer 202 and the FPGA 204. The co-simulation interface 216 further includes profiling logic 250 configured to perform real-time profiling of the embedded system during simulation. The profiling logic 250 may be distributed between the computer 202 and the FPGA 204, i.e., between the co-simulation input logic 216A and the co-simulation output logic 216B. An exemplary embodiment of the profiling logic 250 is shown in FIG. 3 and described below.

In operation, the simulation module 219 initializes the FPGA 204 with the embedded system and controls the simulation of the embedded system. In the initialization phase, the simulation module 219 configures the FPGA 204 with the hardware and software portions of the embedded system, e.g., one or more of the peripherals 224 and the program 230. The simulation module 219 may also generate at least a portion of the co-simulation interface 216. For example, the simulation module 219 may configure the FPGA 204 with the co-simulation output logic 216B.

In some embodiments, the simulation module 219 obtains one or more events of interest of the embedded system to be profiled. The simulation module 219 generates at least a portion of the profiling logic 250 based on the selected events of interest. That is, the profiling logic 250 is customized based on the selected events of interest to be profiled. For example, the simulation module 219 may configured the FPGA 204 with a customized portion of the profiling logic 250.

In the simulation phase, the simulation module 219 drives the simulation of the embedded system. For example, the simulation module 219 may cause the communication of control signals between the computer 202 and the FPGA 204 via the co-simulation interface 216 to invoke or otherwise control the simulation. The simulation module 219 may pass input stimuli to the embedded system operating in the FPGA 204 via the co-simulation interface 216. The simulation module 219 may also capture output data produced by the embedded system operating in the FPGA 204 via the co-simulation interface 216. Notably, the simulation module 219 may obtain profile data 220 produced the profiling logic 250. The profile data 220 may be stored in the memory 220 and can be subsequently analyzed by the data analysis module 218.

FIG. 3 is a block diagram depicting an exemplary embodiment of the profiling logic 250 in accordance with one or more aspects of the invention. The profiling logic 250 may include event detection logic 302, a timer 304, clock control logic 306, first-in-first-out (FIFO) logic 308, and FIFO logic 310. The event detection logic 302, the timer 304, the clock control logic 306, and the FIFO logic 308 are part of the co-simulation output logic 216B in the FPGA 204. The FIFO logic 310 is part of the co-simulation input logic 216A in the computer 202. The FIFO logic 308 may be referred to as the "first memory" and the FIFO logic 310 may be referred to as the "second memory."

Inputs of the event detection logic 302 are coupled to the processor 222 and the peripherals 224, respectively. Notably, the processor 222 includes a program counter (PC) 314 and the peripherals 224 include input/output (I/O) pins 316. The event detection logic 302 is configured to obtain program location from the PC 314 of the processor 222 and status information from the I/O pins 316 of the peripherals 224. Outputs of the event detection logic 302 are coupled to the timer 304 and the FIFO logic 308, respectively.

An output of the timer 304 is coupled to the FIFO logic 308. An output of the FIFO logic 308 is coupled to the clock control logic 306. An output of the clock control logic 306 is coupled to clock logic 312. The clock logic 312 is configured to generate a clock signal for driving the processor 222. Another output of the FIFO logic 308 is coupled to the FIFO logic 310. The FIFO logic 310 may be in communication with the memory 208 via the bus 214.

Referring to FIGS. 1 and 2, the profiling logic 250 supports profiling of two kinds of events: processor events and peripheral events. A processor event may be the occurrence of the processor execution reaching some specific location of the program 230 (e.g., a specific portion of the program 230, such as a specific function, line of code, etc.). A peripheral event may be the occurrence of a peripheral entering some specific status. As discussed above, events of interest for profiling are obtained by the simulation module 219 (e.g., specified by the user). The simulation module 219 may then encode the selected events based on some identification criteria.

For example, in some embodiments, the simulation module 219 encodes the selected events into integer event numbers. Each of the selected events of interest may be assigned an integer number identifier. Since events may occur concurrently in time, the encoding of the selected events can be such that the bit-wise OR result of their integer numbers reveals the occurrence of concurrent events.

For example, consider events A, B, and C as denoting the occurrence of processor execution reaching locations $L_A$, $L_B$, and $L_C$ in the program 230, respectively. Events A, B, and C can not happen concurrently, i.e., the execution of the program 230 cannot be in two locations at the same time. Assume there is an event D that denotes a peripheral entering a specific state $S_D$. Assume further that state $S_D$ may happen concurrently with any of the events A, B, and C. In this case, the upper most significant bits of a three-bit integer can be used to encode events A, B, and C, for example, 01, 10, and 11, respectively. The least significant bit can be used to encode event D as 1. Then, for example, a bit-wise OR result of 101 denotes that events B and D occur at the same time. A bit-wise OR result of 111 denotes that the events C and D occur at the same time. A bit-wise OR result of 011 denotes that events A and D occur at the same time.

Based on the encoding of the selected events, the simulation module 219 generates customized event detection logic 302 that is capable of detecting occurrence of any of the selected events. For a processor event, the event detection logic 302 compares the program location as stored in the PC 314 with the selected location in the program 230 during execution of the program 230. Upon detection of such processor event, the event detection unit 302 generates the identifier associated with the event (e.g., the integer number associated with the event). For a peripheral event, the event detection logic 302 compares status as indicated by the input and/or output pins 316 with the selected status during execution. Upon detection of such peripheral event, the event detection unit 302 generates the identifier associated with the event (e.g., the integer number associated with the event). The event detection logic 302 performs a bit-wise OR operation on the event identifiers (e.g., integer numbers) so as to capture any concurrent events.

Upon detection of an event or concurrent events, the event detection unit 302 pushes the bit-wise OR result into the FIFO logic 308. The FIFO logic 308 includes a FIFO channel 318A and a FIFO channel 320A. The channels 318A and 320A may be separate FIFO memories or may be separate logical FIFOs in a signal memory. The FIFO channel 318A is configured to store bit-wise OR results from the event detection unit 302. The timer 304 is configured to track elapsed time. When the event detection unit 302 pushes a bit-wise OR result into the FIFO channel 318A, the timer 304 pushes a time stamp value into the FIFO channel 320A. The time stamp provides an indication of the time the detected event(s) occurred. The timer 304 can be triggered by the event detection logic 302. In this manner, each bit-wise OR result from the event detection logic 302 in the FIFO channel 318A includes a corresponding time stamp value generated by the timer 304 in the FIFO channel 320A. The bit-wise OR results and corresponding time stamps produced by the event detection logic 302 and stored in the FIFO logic 308 are referred to as profiling data.

As the simulation is performed, the profiling data stored in the FIFO logic 308 are popped and transmitted to the input co-simulation logic 216A in the computer 202. In particular, the popped profiling data are pushed into the FIFO logic 310. The FIFO logic 310 includes a FIFO channel 318B and a FIFO channel 320B. The FIFO channel 318B stores bit-wise OR results from the event detection logic 302, and the FIFO channel 320 stores corresponding time stamps for the bit-wise OR results. The FIFO channels 318A and 318B logically comprise a shared FIFO 318, with a portion running on the FPGA 204 and another portion running on the computer 202. Likewise, the FIFO channels 320A and 320B logically comprise a shared FIFO 320, with a portion running on the FPGA 204 and another portion running on the computer 202. The FIFO channels 318A and 320A continuously transmit profiling data to the FIFO channels 318B and 320B during the simulation for as long as the FIFO channels 318A and 320B contain data to be transmitted. The simulation module 219 and/or the data analysis module 218 may be configured to obtain the profiling data from the FIFO logic 310 for storage in the memory 208 as the profile data 230.

The clock control logic 306 is configured to monitor the available space in the shared FIFOs 318 and 320. If the available space falls below a first threshold value, the clock control logic 306 suspends the clock logic 312, i.e., the execution cycle of the processor 222 is suspended. Notably, the suspension of the clock logic 312 does not affect operation of the profiling logic 250. Thus, the profiling data stored in the FIFO logic 308 continues to be transmitted to the FIFO logic 310 while the clock logic 312 and the processor 222 are suspended. If the available space in the shared FIFOs 318 and 320 exceeds a second threshold value, the clock control logic 306 resumes the clock logic 312 and hence the execution cycle of the processor 222. Any new profiling data generated by the event detection logic 302 is again pushed into the FIFO logic 308.

Accordingly, a real-time, non-intrusive profiling technique is provided. A user can select a set of events of interest in the simulated embedded system. A customized hardware co-simulation interface between a computer and an FPGA is then generated based on the selected events. The embedded system and the customized co-simulation interface are initialized in the FPGA and simulation commences. During simulation, the events and their occurrence times are captured by the hardware co-simulation interface. The captured profiling data is temporarily stored using memory on the FPGA (i.e., on-chip memory). However, the profiling data stored in the on-chip memory is continuously transmitted to the computer through the hardware co-simulation interface. The hardware co-simulation interface monitors the available on-chip memory space and temporarily suspends the execution of the embedded system when the available memory space is less than a threshold value, $S_{HIGH}$. In cause of suspension, the hardware co-simulation interface resumes execution of the embedded system when the available space is more than a threshold value, $S_{LOW}$.

This suspend-resume mechanism advantageously ensures that the profiling data is correctly transmitted from the FPGA to the computer for storage and analysis. Moreover, the on-chip memory does not need to store all of the generated profiling data, which conserves memory resources in the FPGA. Thus, the hardware co-simulation interface can employ a small amount of on-chip memory space, as compared to an abundant amount of memory space on the computer. Furthermore, the profiling data is collected in real-time as the embedded system is operating in the FPGA. This provides profiling speed advantages, allowing users to quickly identify the processing bottlenecks and evaluate the various hardware-software partitioning possibilities. In addition, the real-time profiling technique does not deleteriously affect the cycle-by-cycle behavior of the processor in the embedded system.

Figure 4:
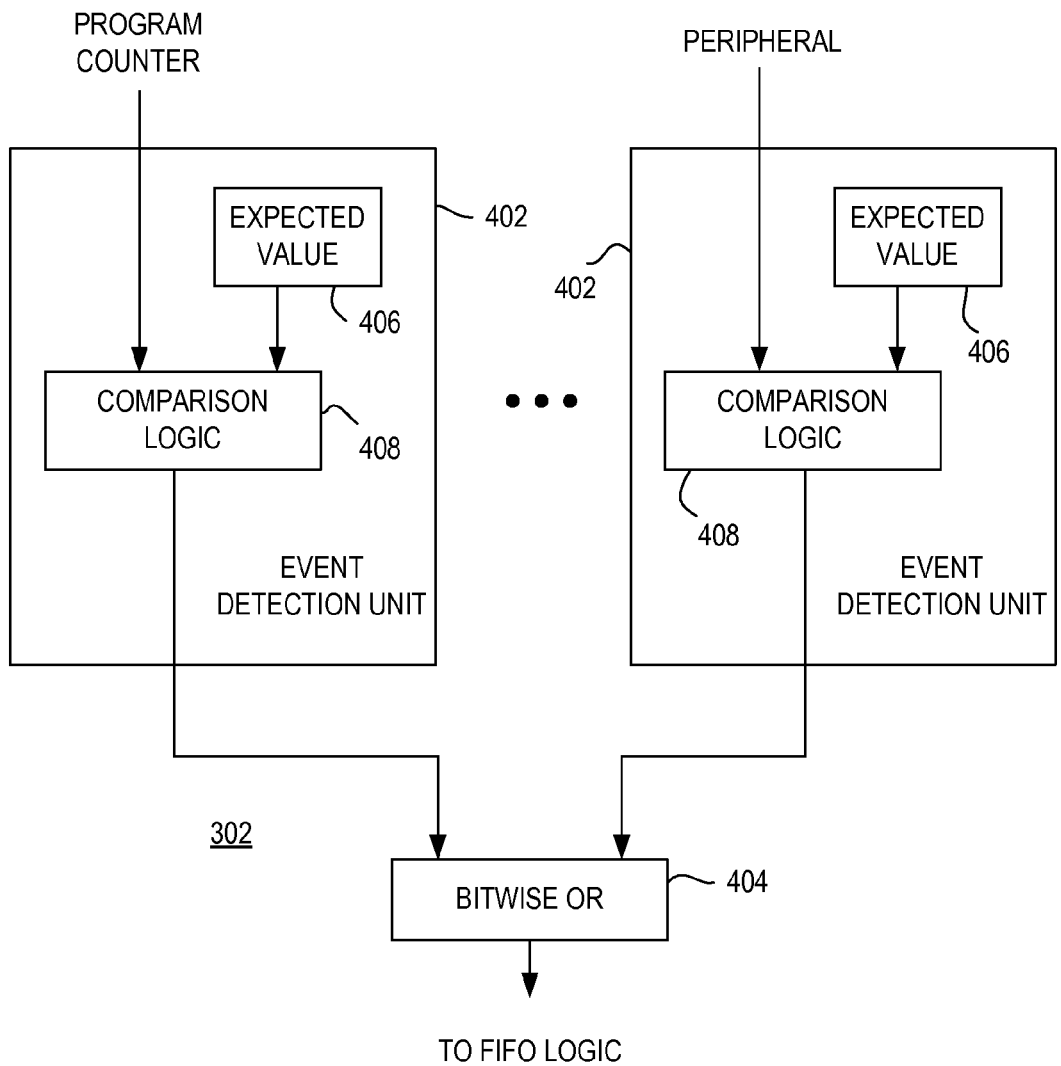
FIG. 4 is a block diagram depicting an exemplary embodiment of event detection logic in accordance with one or more aspects of the invention.

FIG. 4 is a block diagram depicting an exemplary embodiment of the event detection logic 302 in accordance with one or more aspects of the invention. The event detection logic 302 includes a plurality of event detection units 402 and a bit-wise OR circuit 404. Each of the event detection units 402 is configured to detect either a processor event or a peripheral event. If an event detection unit detects a processor event, the event detection unit is configured to receive data from the PC 314 in the processor 222. If an event detection unit detects a peripheral event, the event detection unit is configured to receive data from a peripheral.

Each of the event detection units 402 includes a memory 406 and comparison logic 408. The memory 406 is configured to store an expected value for the event. For example, the memory 406 may comprise a register that stores an expected program location for a processor event or an expected status value for a peripheral event. For a processor event, inputs of the comparison logic 408 are configured to receive a value from the PC 314 and the expected value stored in the memory 406. For a peripheral event, inputs of the comparison logic 408 are configured to receive a value from the peripheral and the expected value stored in the memory 406. In either case, an output of the comparison logic 408 is coupled to the bit-wise OR circuit 404. The bit-wise OR circuit 404 performs a logical OR operation on its inputs from all of the event detection units 402. The output of the bit-wise OR circuit 404 provides a bit-wise OR result for stored in the FIFO logic 308.

Figure 5:
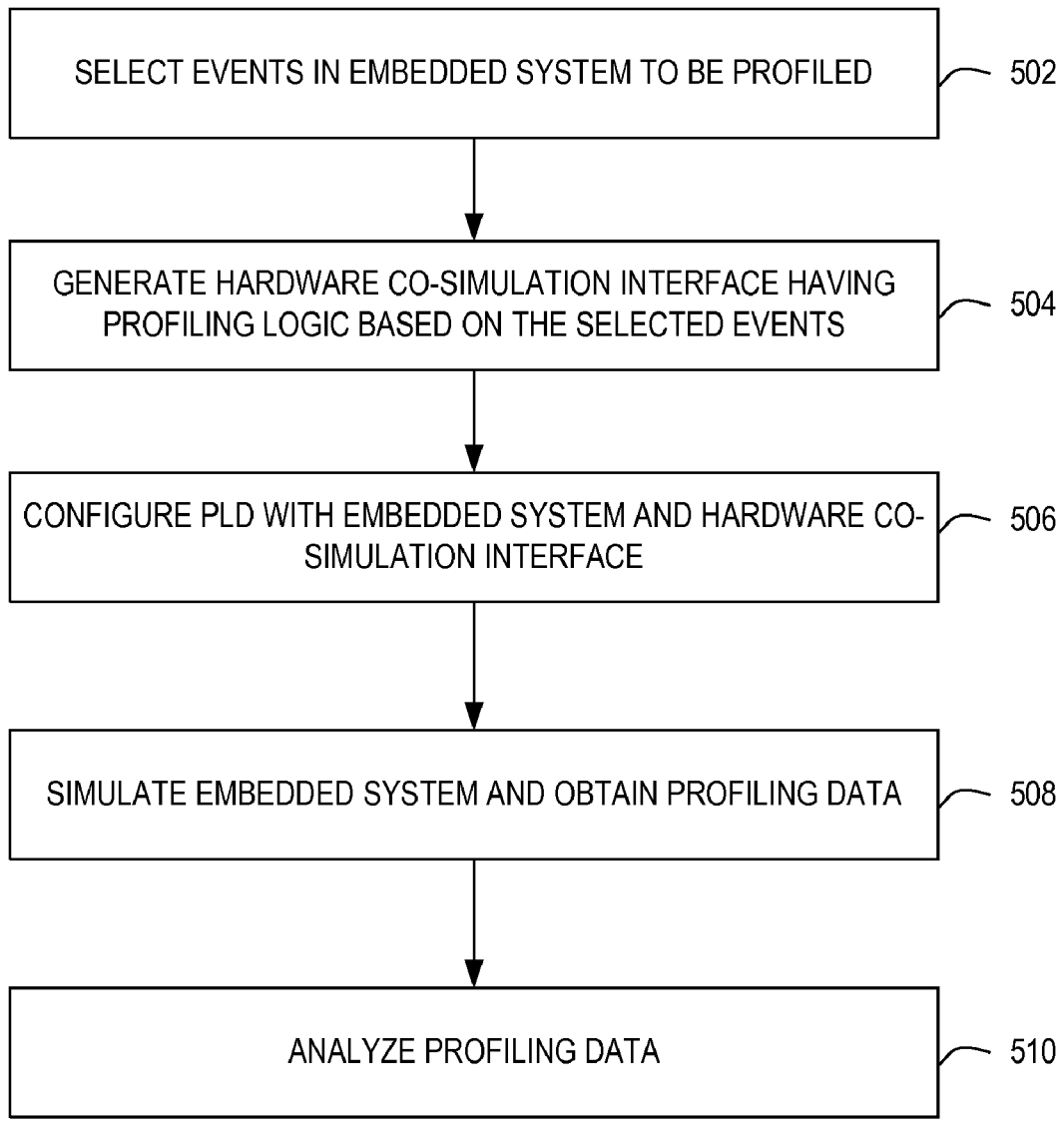
FIG. 5 is a flow diagram depicting an exemplary embodiment of a method for initializing a co-simulation system in accordance with one or more aspects of the invention.

FIG. 5 is a flow diagram depicting an exemplary embodiment of a method 500 for initializing a co-simulation system in accordance with one or more aspects of the invention. The embedded system may include a software portion and a hardware portion. The software portion may include program code to be executed by a processor. The hardware portion may include one or more peripherals coupled to the processor. The co-simulation system may comprise a PLD driven by a computer.

The method 500 begins at step 502, where events of an embedded system to be profiled are selected. At step 504, a hardware co-simulation interface having profiling logic based on the selected events is generated between the PLD and the computer. At step 506, the PLD is configured with the embedded system and the hardware co-simulation interface. At step 508, the embedded system is simulated and profiling data for the selected events is obtained. At step 510, the profiling data may be analyzed.

Figure 6:
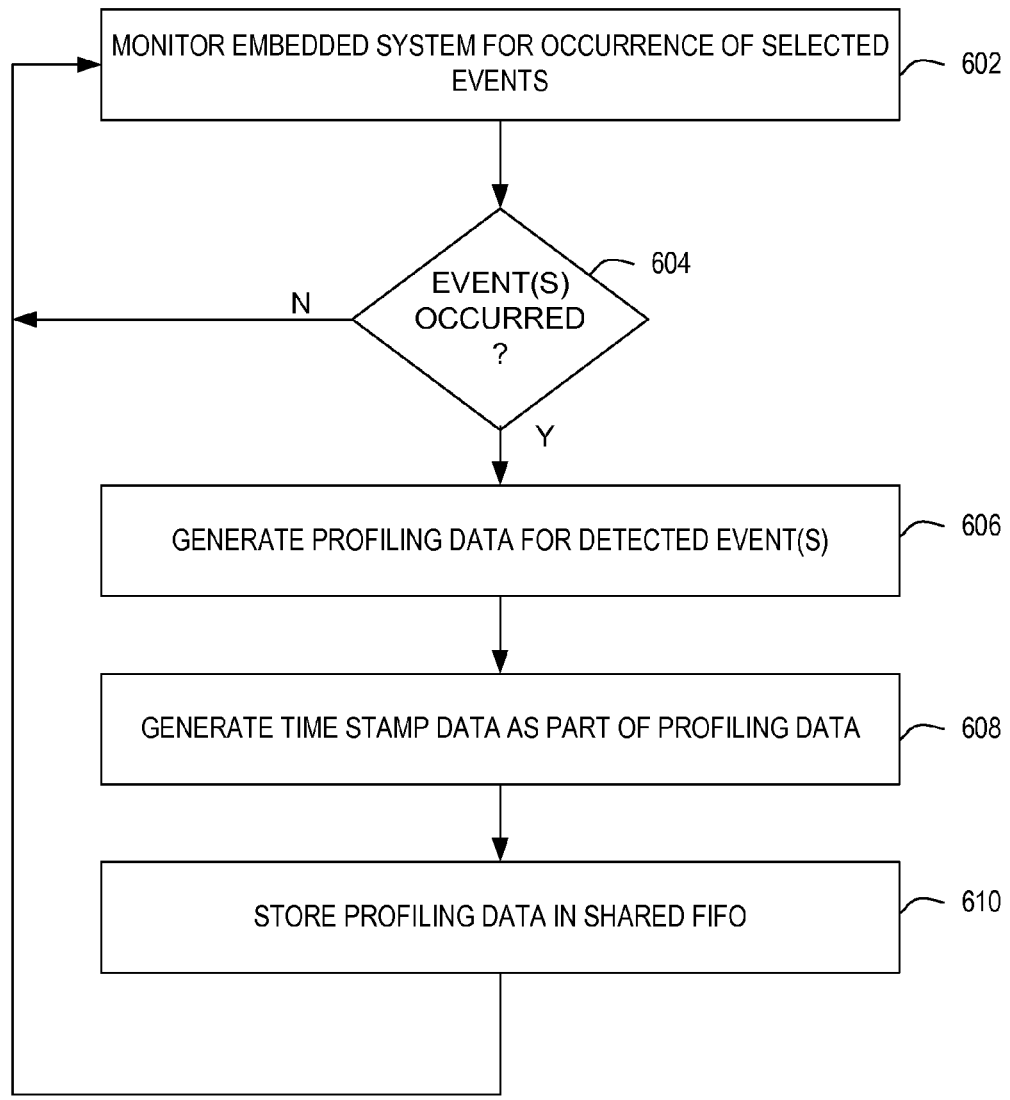
FIG. 6 is a flow diagram depicting an exemplary embodiment of a method for profiling an embedded system in accordance with one or more aspects of the invention.

FIG. 6 is a flow diagram depicting an exemplary embodiment of a method 600 for profiling an embedded system in accordance with one or more aspects of the invention. The method 600 may be performed in step 508 of the method 500. At step 602, the embedded system is monitored for occurrence of the selected events. In some embodiments, each of the selected events is one of a process or event or a peripheral event. As described above, a processor event signifies occurrence of the processor reaching a pre-defined location in the program code. A peripheral event signifies occurrence of a peripheral entering a pre-defined status. The step 602 may include a step of comparing, for each processor event, a predefined program location with a program location obtained from the PC in the processor. The step 602 may include a step of comparing, for each peripheral event, a predefined status with a status obtained from I/O pins of a peripheral.

At step 604, a determination is made whether one or more of the selected events has or have occurred. If not, the method 600 returns to step 602 and repeats. If so, the method 600 proceeds to step 606. At step 606, profiling data is generated for the detected event(s). In some embodiments, each of the plurality of events is associated with an integer identifier. The step 606 may include a step of generating the integer identifier associated with each detected event. Moreover, the step 606 may include a step of computing a bit-wise OR the generated integer identifier(s). Thus, the profiling data may include bit-wise OR results. At step 608, a time stamp may be generated for each bit-wise OR result and included as part of the profiling data. At step 610, the profiling data is stored in shared FIFO logic of the PLD and the computer. The method 600 returns to step 602 and repeats.

Figure 7:
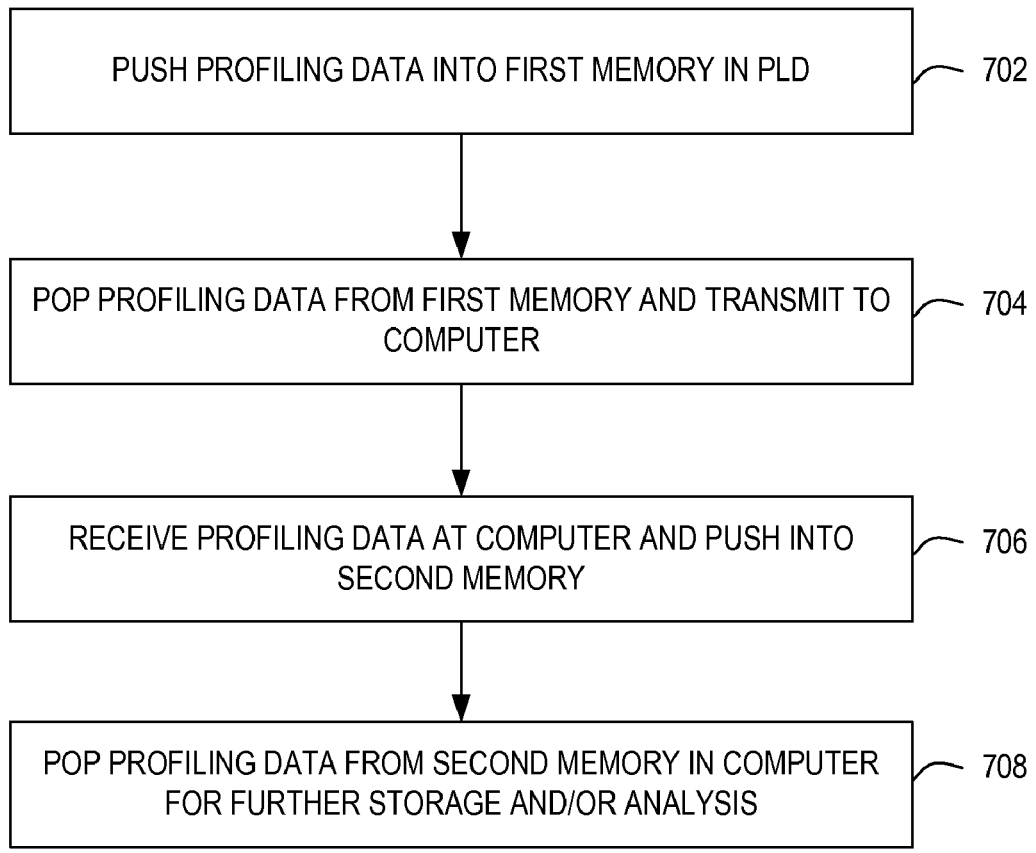
FIG. 7 is a flow diagram depicting an exemplary embodiment of a method for transferring profiling data through the shared FIFO logic in accordance with one or more aspects of the invention.

FIG. 7 is a flow diagram depicting an exemplary embodiment of a method 700 for transferring profiling data through the shared FIFO logic in accordance with one or more aspects of the invention. The shared FIFO logic may include a first FIFO channel for the bit-wise OR results and a second FIFO channel for the time stamps. The shared FIFO logic may be implemented using a first memory in the PLD and a second memory in the computer. At step 702, the profiling data is pushed into the first memory. Bit-wise OR results may be stored into the first FIFO channel and time stamps may be stored into the second FIFO channel. At step 704, the profiling data is popped from the first memory and transmitted to the computer. At step 706, the profiling data is received at the computer and pushed into the second memory. At step 708, the profiling data may be popped from the second memory for further storage and/or analysis. The method 700 may be repeatedly executed as new profiling data is produced. Notably, the method 700 may execute concurrently with the method 600. That is, profiling data is transmitted from the PLD to the computer as the event detection process is performed to generate the profiling data.

Figure 8:
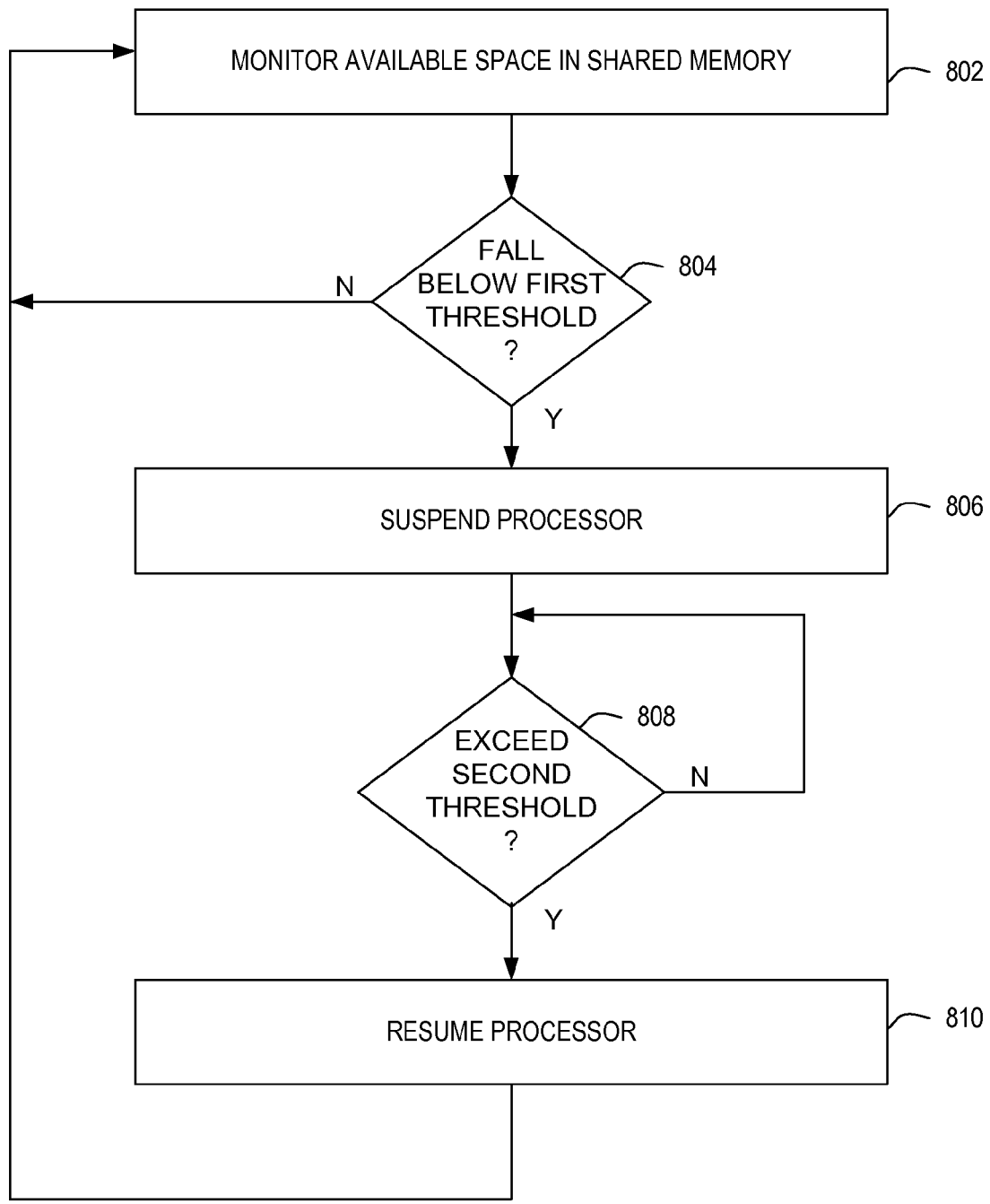
FIG. 8 is a flow diagram depicting an exemplary embodiment of a method for monitoring the shared FIFO in accordance with one or more aspects of the invention.

FIG. 8 is a flow diagram depicting an exemplary embodiment of a method 800 for monitoring the shared FIFO in accordance with one or more aspects of the invention. At step 802, available space in the shared FIFO is monitored. For example, available space in the first memory in the PLD may be monitored. At step 804, a determination is made whether the available space has fallen below a first threshold. If not, the method 800 returns to the step 802 and repeats. If so, the method 800 proceeds to step 806. At step 806, the processor is suspended. For example, clock logic driving the processor may be halted to suspend the processor. Since the processor is suspended, no more events will be generated by either the processor or the peripherals and thus the generation of new profiling data is also suspended. This allows the profiling data already generated and stored in the shared FIFO to be pushed through and for the available space to be increased.

At step 808, a determination is made whether the available space has exceeded a second threshold. If not, step 808 is repeated. If the available space has exceeded the second threshold, the method 800 proceeds to step 810. At step 810, the processor is resumed. Thus, new profiling data may be generated and stored in the shared FIFO logic. The method 800 may return to step 802 and repeat. The method 800 may execute concurrently with the methods 600 and 700. That is, the shared FIFO logic is monitored while events are detected, profiling data is produced, profiling data is stored, and profiling data is transmitted to the computer.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method of profiling an embedded system, wherein the embedded system includes a processor executing program code and at least one peripheral coupled to the processor, the method comprising:
   generating a hardware co-simulation interface between a programmable IC configured with the embedded system and a computer based on a plurality of events;
   simulating the embedded system in the programmable IC;
   detecting, during the simulation of the embedded system, occurrence of at least one detected event of the plurality of events to produce profiling data;
   wherein the detecting includes:
      comparing a program location obtained from a program counter of the processor to a pre-defined location in the program code; and
      comparing a status value obtained from input/output pins of the at least one peripheral to a pre-defined status value associated with a peripheral event of the plurality of events;
   storing the profiling data into shared first-in-first-out (FIFO) logic of the programmable IC and the computer; and
   retrieving the profiling data from the shared FIFO logic at the computer; and
   storing the retrieved profiling data in a memory at the computer.

2. The method of claim 1, wherein each of the plurality of events is associated with an integer identifier, and wherein the step of detecting comprises:
   generating the integer identifier associated with each of the at least one detected event;
   computing, for integer identifiers generated concurrently, a bit-wise OR of such integer identifiers.

3. The method of claim 2, wherein the profiling data comprises bit-wise OR results and time stamps respectively associated with the bit-wise OR results.

4. The method of claim 3, wherein the step of storing comprises:
   storing the bit-wise OR results in a first FIFO channel in the shared FIFO logic; and
   storing the time stamps in a second FIFO channel in the shared FIFO logic.

5. The method of claim 1, wherein the shared FIFO logic comprises a first memory in the programmable IC and a second memory in the computer, and wherein the step of storing comprises:
   storing portions of the profiling data as the profiling data is produced in the first memory; and
   transmitting the portions of the profiling data to the computer for storage in the second memory.

6. The method of claim 5, further comprising:
   monitoring available space in the first memory; and
   suspending a processor in the embedded system in response to the available space falling below a first threshold.

7. The method of claim 6, further comprising:
   resuming the processor as suspended in response to the available space exceeding a second threshold.

8. Apparatus for profiling an embedded system, wherein the embedded system includes a processor configured to execute program code and at least one peripheral coupled to the processor, the apparatus comprising:
   a hardware co-simulation interface between a programmable integrated circuit (IC) configured with the embedded system and a computer;
   profiling logic in the hardware co-simulation interface configured to detect occurrence of a plurality of events during simulation of the embedded system to produce profiling data;
   wherein the profiling logic is further configured to:
      compare a program location obtained from a program counter of the processor to a pre-defined location in the program code; and
      compare a status value obtained from input/output pins of the at least one peripheral to a pre-defined status value associated with a peripheral event of the plurality of events; and
   first-in-first-out (FIFO) logic configured to store the profiling data produced by the profiling logic in a first FIFO memory and transmit the profiling data from the first FIFO memory for storage in a second FIFO memory.

9. The apparatus of claim 8, wherein the profiling logic comprises:
   a plurality of event detection units each configured to detect a respective one of the plurality of events; and
   a bitwise OR circuit coupled to each of the plurality of event detection units.

10. The apparatus of claim 9, wherein each of the plurality of event detection units comprises:
    a memory for storing an expected value; and
    comparison logic for comparing an input value to the expected value.

11. The apparatus of claim 8, wherein the profiling logic comprises:
    clock control logic configured to monitor available space in the shared FIFO logic, suspend the processor in response to the available space falling below a first threshold, and resume the processor as suspended in response to the available space exceeding a second threshold.

12. The apparatus of claim 8, wherein the profiling data includes time stamps and wherein the profiling logic comprises:
    a timer for generating the time stamps.

13. The apparatus of claim 8, wherein the shared FIFO logic comprises:
    a first memory in the programmable IC; and
    a second memory in the computer.

14. A co-simulation system, comprising:
    a programmable integrated circuit configured with an embedded system, wherein the embedded system includes a processor configured to execute program code and at least one peripheral coupled to the processor;
    a computer configured to drive a simulation of the embedded system in the programmable IC;
    a hardware co-simulation interface between programmable IC and the computer;
    profiling logic in the hardware co-simulation interface configured to detect occurrence of a plurality of events during simulation of the embedded system to produce profiling data;

wherein the profiling logic is further configured to:
compare a program location obtained from a program counter of the processor to a pre-defined location in the program code; and
compare a status value obtained from input/output pins of the at least one peripheral to a pre-defined status value associated with a peripheral event of the plurality of events; and first-in-first-out (FIFO) logic configured to store the profiling data produced by the profiling logic in a first FIFO memory and transmit the profiling data from the first FIFO memory for storage in a second FIFO memory at the computer.

* * * * *